United States Patent
Bloedorn

[19]

[11] Patent Number: 5,826,539
[45] Date of Patent: Oct. 27, 1998

[54] EXPANDED MESH BIRD FEEDER

[76] Inventor: Dan A. Bloedorn, 1500 A. Wisconsin Ave., New Holstein, Wis. 53061

[21] Appl. No.: 679,049

[22] Filed: Jul. 12, 1996

[51] Int. Cl.$^6$ .................................................. A01K 39/01
[52] U.S. Cl. ........................................................ 119/52.2
[58] Field of Search ............................. 119/51.03, 52.2, 119/52.3, 57.8, 57.9; 52/670

[56] References Cited

U.S. PATENT DOCUMENTS

| | | | |
|---|---|---|---|
| D. 214,735 | 7/1969 | Cooper | D30/13 |
| D. 277,514 | 2/1985 | Bescherer | D30/14 |
| D. 351,691 | 10/1994 | Lipton | D30/127 |
| 1,123,501 | 1/1915 | Dreibelbis . | |
| 1,891,042 | 12/1932 | Benoit . | |
| 3,186,379 | 6/1965 | Grella | 119/57.9 |
| 4,434,745 | 3/1984 | Perkins et al. . | |
| 4,559,752 | 12/1985 | Kieffer | 52/670 |
| 5,111,772 | 5/1992 | Lipton | 119/57.9 |
| 5,195,459 | 3/1993 | Ancketill | 119/57.9 |
| 5,377,617 | 1/1995 | Harwich | 119/6.5 |
| 5,479,878 | 1/1996 | Coulter | 119/51.03 |

OTHER PUBLICATIONS

SPANTEK, "Technical Guidelines and General Tolerances", 4 pages.
Color Dome Feeders by Bird Stuff / Two–sided promotion.
Liethen Enterprises letter dated Mar. 28, 1996.
Liethen Enterprises letter dated Apr. 30, 1996.
Bird Company catalog sheet.
Bird Company catalog price list.

*Primary Examiner*—Robert P. Swiatek
*Attorney, Agent, or Firm*—Foley & Lardner

[57] ABSTRACT

Bird feeders of various shapes are formed at least partially of an expanded steel mesh material. The mesh is formed from thin sheet metal which is slit, expanded and formed into a portion of a bird feeder body.

6 Claims, 5 Drawing Sheets

5,826,539

EXPANDED MESH BIRD FEEDER

BACKGROUND OF THE INVENTION

This invention relates to a variety of bird feeders incorporating expanded metal mesh as a portion of the bird feeder body.

Many bird feeders incorporate either woven or welded wire screening or mesh for the purpose of retaining bird feed. The screening or mesh may be incorporated into the sides of the bird feeder and/or form a portion of the bottom of the feeder in order to permit drainage while retaining the feed.

Examples of bird feeders using conventional screening or mesh are illustrated by: U.S. Pat. Nos. 1,123,501; 1,891,042; 4,434,745; 5,111,772; 5,195,459; 5,377,617 and 5,479,878; and Design Patent Nos. Des. 214,735; 277,514 and 351,691.

The welded or woven wire screening, which may be galvanized and/or vinyl coated, is relatively expensive and lacks strength and rigidity unless the mesh is substantially oversized or double layers are used. The issue of strength occurs, for example, when the mesh is incorporated into a seed catcher tray or in the bottom of a conventional bird feeder.

SUMMARY OF THE INVENTION

It is an object of the instant invention to provide an expanded metal mesh material which may be incorporated into numerous positions of various types of feeders. The expanded mesh provides a more durable and less expensive product to manufacture. By using steel, for example, the expanded mesh does not require the steps of welding, or weaving and galvanizing as is customary with wire mesh or screening.

Another object is to provide an expanded metal mesh, as well as a method of making the mesh such that the size of the openings can be regulated during manufacture. Thus, the ultimate feeder will be more attractive to the desired specie of bird by conforming the openings to a particular feed, which in turn will attract particular species of birds.

The objects are accomplished by constructing various types of bird feeders with expanded steel mesh walls and/or bottoms, depending upon the particular variety of feeder. The mesh is formed from sheet material and incorporated into the feeder.

Other objects and advantages provided by the present invention will become apparent from the following description in conjunction with the accompanying drawings.

DETAILED DESCRIPTION OF THE PREFERRED EMBODIMENTS

Figure 1:
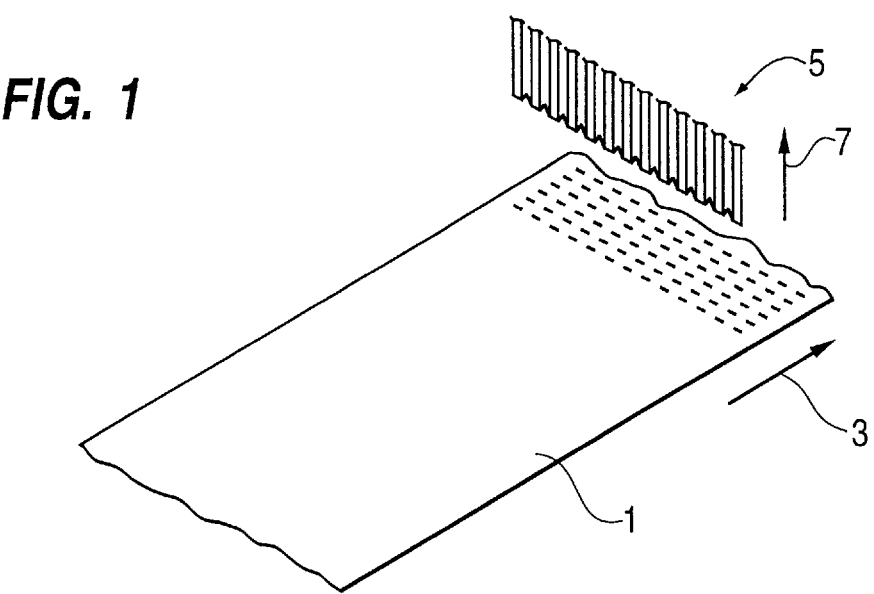
FIG. 1 schematically illustrates the process of making the expanded metal mesh.
Figure 2:
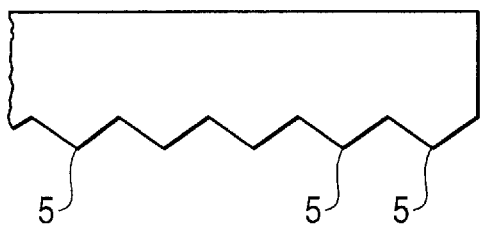
FIG. 2 is a schematic view of the die of FIG. 1.
Figure 3:
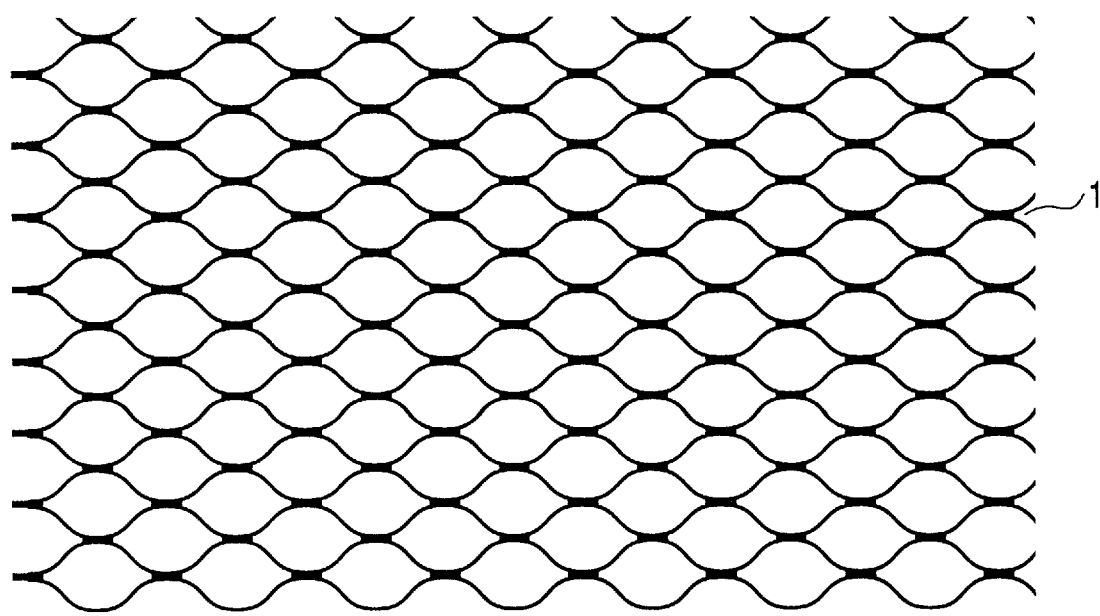
FIG. 3 shows one form of the expanded mesh after being formed and prior to incorporation into a bird feeder.

FIG. 1 illustrates a schematic of the manufacture of the mesh which forms the basis for the invention. A sheet of metal material 1 moves in the direction of arrow 3 underneath a serrated cutting die 5 (see FIG. 2) which moves up and down as seen at arrow 7. (Other portions of the die are not shown) The process of mechanically advancing the plate or sheet 1 beyond the face of the bottom of the die is well known in the metal processing field. The sheet is mechanically advanced an amount equal to the strand width of regular expanded metal before flattening. The top cutting die 5 then descends and simultaneously slits and cold forms an entire row of half-diamonds. The top die then ascends and moves one half-diamond to the right as the sheet 1 moves forward one strand width. The top die then descends, slits and forms another full row of half-diamonds completing a row of full diamonds in two strokes. The die then ascends, returns to its initial position and begins to form another row of half- diamonds, repeating the process until a sheet of expanded metal is completed, as seen in FIG. 3.

It will be appreciated that as the die descends, the sheet material is cut and stretched in order to form the diamonds. The depth of the die-cut regulates the size of the diamond which is important in regulating the size and type of feed with which the expanded mesh is used.

Figure 4:
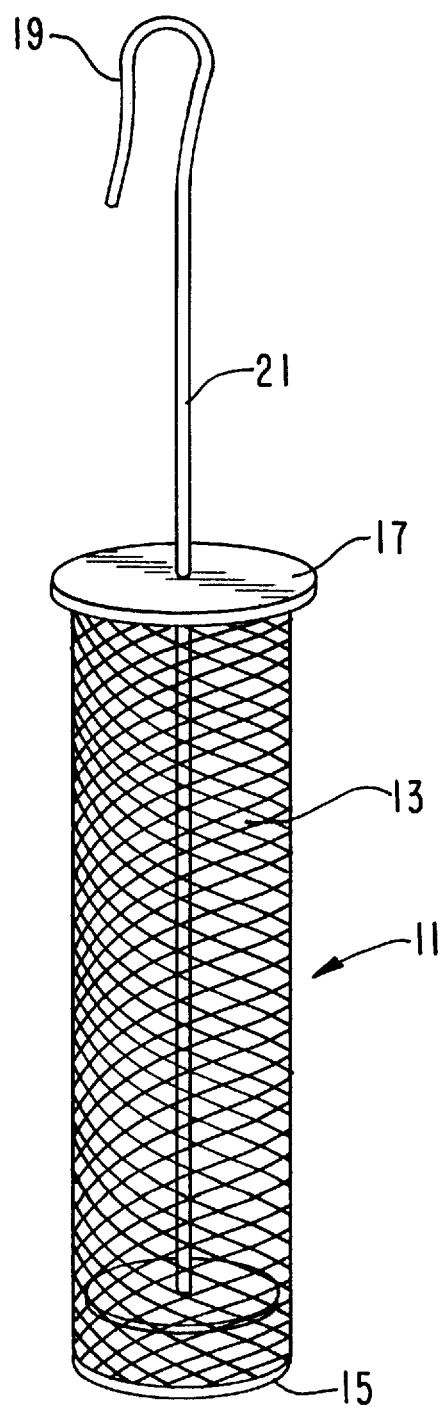
FIG. 4 illustrates a peanut feeder incorporating the instant invention.

FIG. 4 illustrates a common type of peanut feeder 11 formed of expanded mesh 13 and having a cylindrical sidewall. After the expanded mesh is formed, the punched sheet is flattened in order to permit easier working and forming of the bird feeder. The edges of the flattened mesh are welded to form a cylinder, and the finished feeder is then painted by means of a conventional electrostatic process. The bottom can also be formed of the expanded mesh or can include a separate bottom 15 and a top 17. A hook 19 is attached to or forms a part of a steel rod 21 which extends through the center of the body and is attached to the bottom. The size of the mesh of the peanut feeder, as well as with the other feeders discussed below, is selected to conform with the bird feed to be placed in the body. In other words, the mesh of a peanut feeder will be substantially larger than the mesh associated with, for example, a thistle feeder.

Figure 5:
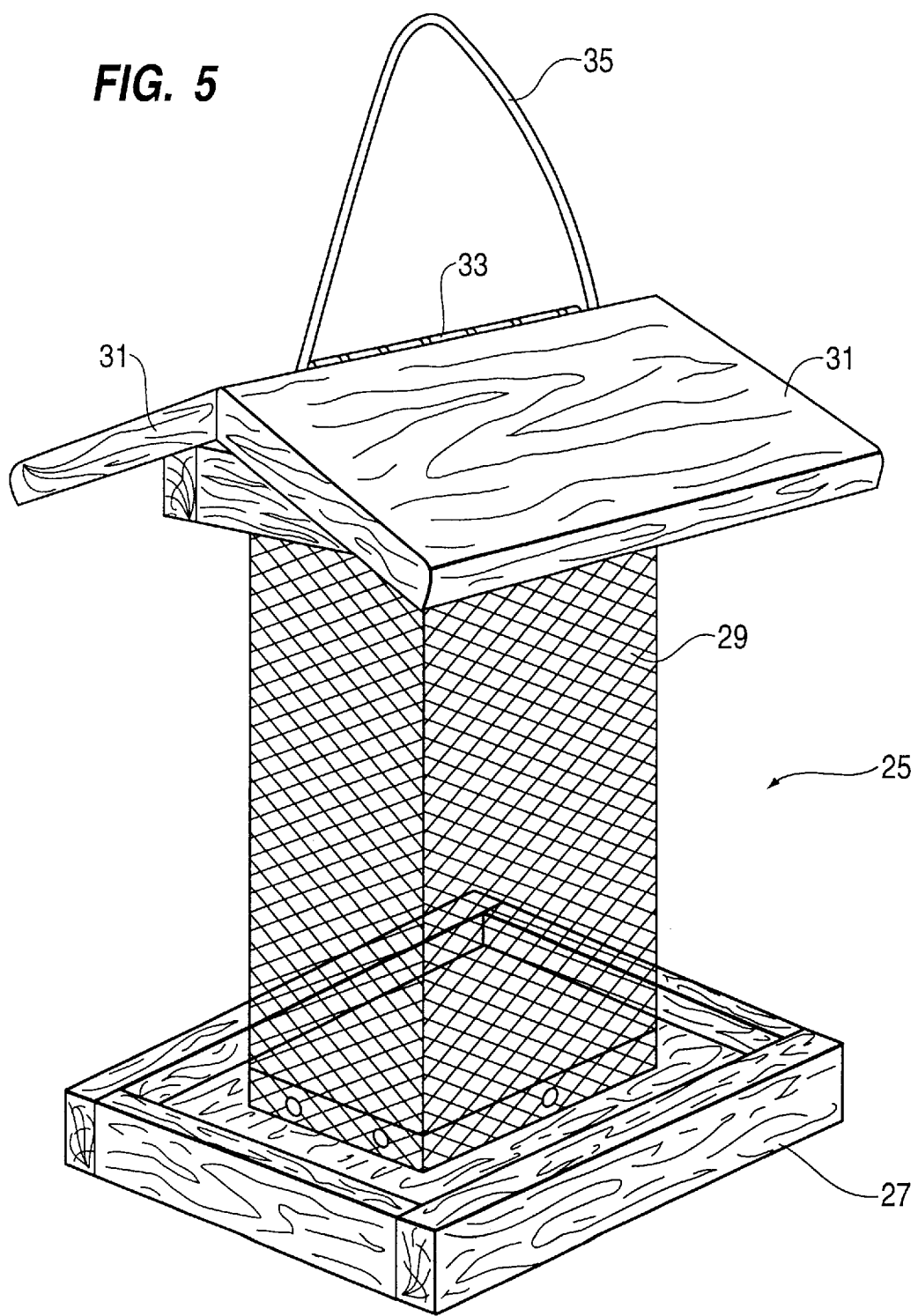
FIG. 5 illustrates a multi-walled bird feeder incorporating the instant invention.

FIG. 5 illustrates a multi-walled feeder 25 having a conventional base 27, a square or rectangular expanded mesh body 29 and a pair of angled roof members 31, one of which is pivoted about a hinge 33 to permit feed to be placed in the body portion 29. A typical hanger 35 is used to attach the feeder to a tree limb or the like.

Figure 6:
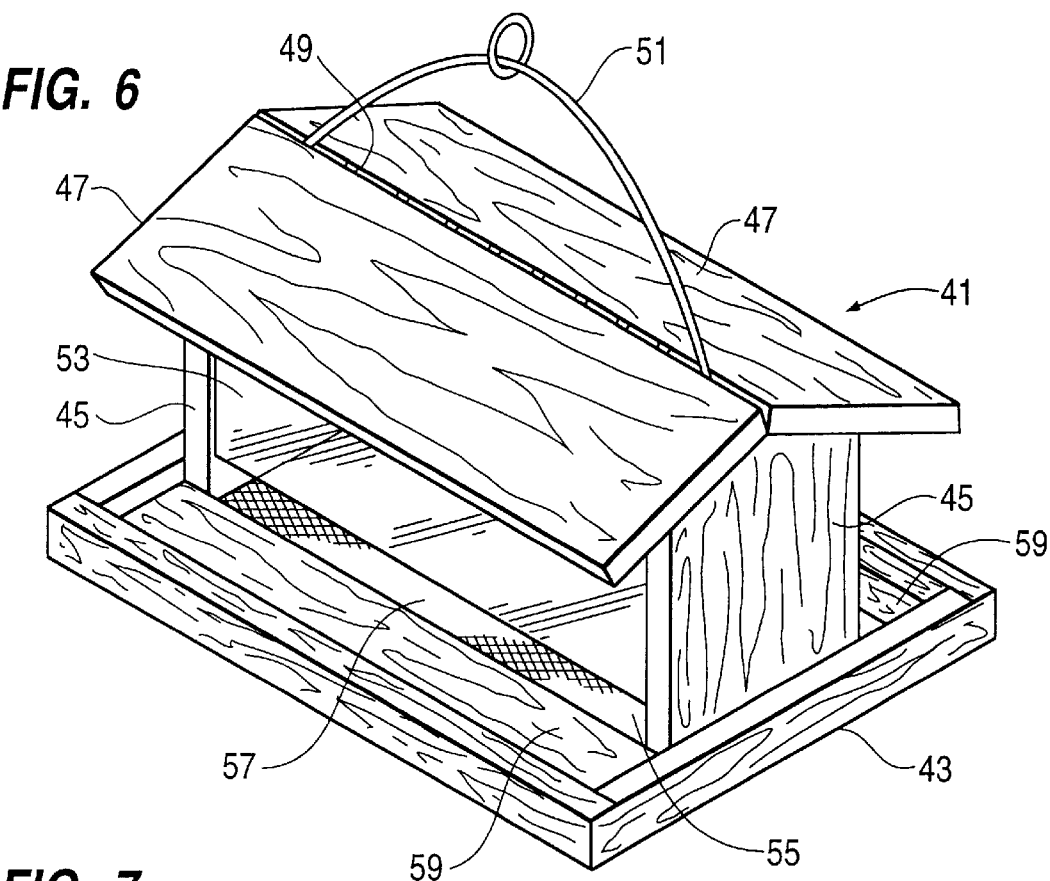
FIG. 6 is a perspective view of a two-sided hopper feeder with an expanded metal mesh floor.

FIG. 6 illustrates a two-sided, standard hopper feeder 41 having a platform 43, a pair of sides 45 and a roof formed by a pair of members 47 hinged at 49. A hanger 51 is attached to the roof for the purpose of suspending the feeder from a tree or the like. A pair of plexiglass feed-retaining members 53 are connected between the sides 45. A conventional triangular member (not shown) may be inserted in the center of the feeder between walls 45 in order to displace the feed toward a pair of openings 55 between the bottom of the plexiglass members 53 and a base or floor 59 of the feeder.

Figure 7:
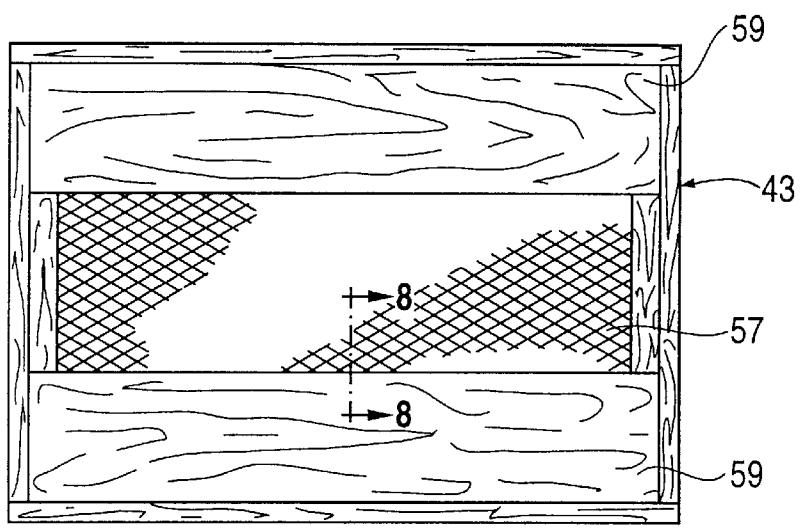
FIG. 7 is a bottom view of the feeder of FIG. 6.
Figure 8:
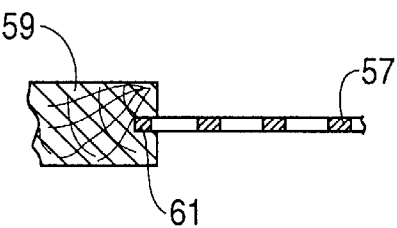
FIG. 8 is a cross-sectional view taken along lines 8—8 in FIG. 7.

The novel portion of the instant hopper feeder as seen in FIGS. 7, is the inclusion of expanded steel mesh 57 extended between a pair of wood members 59. FIG. 8 illustrates the mesh 57 inserted in a groove 61 in members 59. The mesh 57 is used in this feeder, in place of the woven or welded wire mesh of the prior art, to permit drainage. The woven or welded wire mesh, lacking the rigidity and strength of the instant expanded mesh, is normally attached to the top of members such as 59 and is normally either very heavy or includes multiple layers to provide the strength to hold the feed without overly sagging or breaking away.

Figure 9:
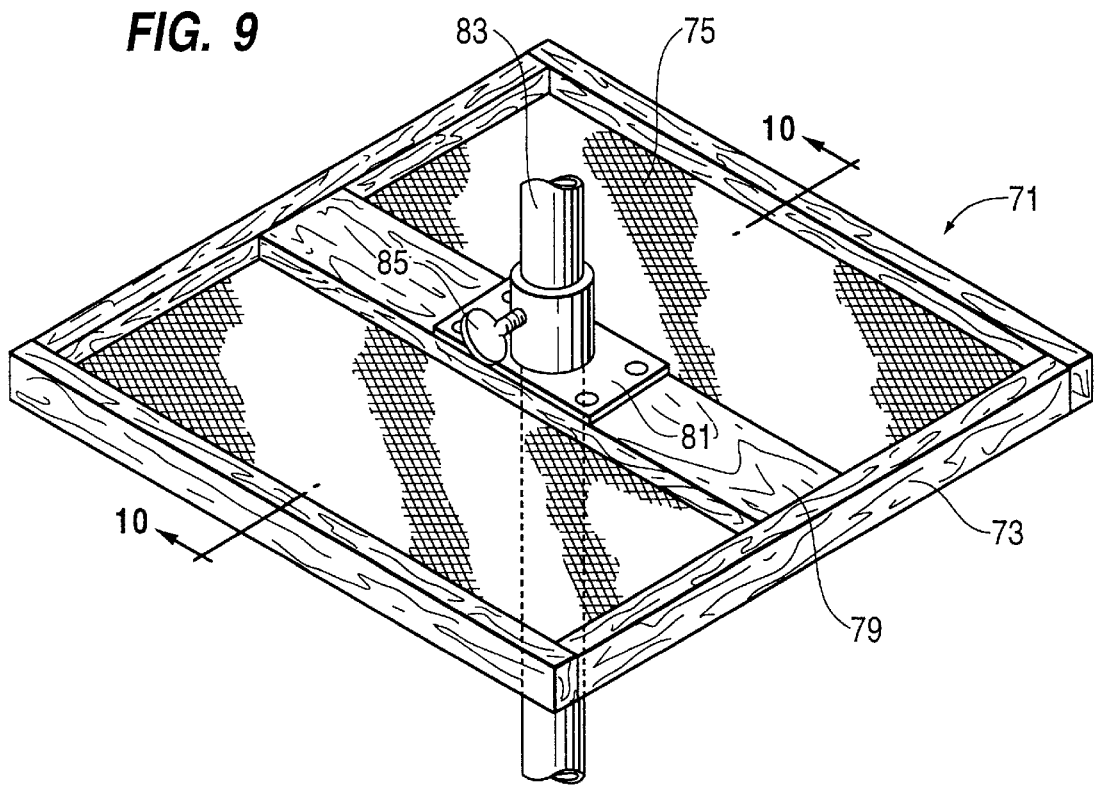
FIG. 9 is a perspective view of a seed catcher tray having an expanded mesh floor.
Figure 10:
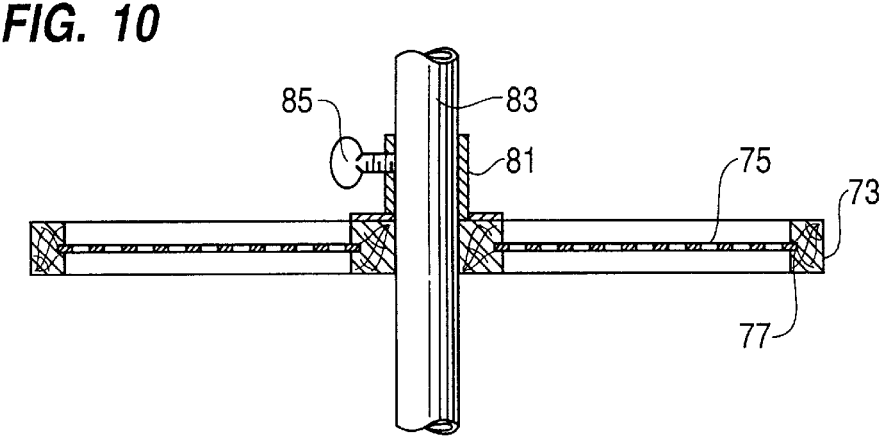
FIG. 10 is a cross-sectional view taken along lines 10—10 in FIG. 9.

FIGS. 9 and 10 illustrate a seed catcher tray 71 having a plurality of side members 73 with the expanded mesh 75 extending therebetween. As with the floor of the hopper feeder, the mesh 75 is inserted in grooves 77 in the side members 73. A center member 79 extends between a pair of the sides 73 and supports a conventional pole receiving support 81, a pole 83 seen inserted therein. The height of the tray on the pole is adjusted by means of a thumb screw 85. The seed catcher tray is normally mounted underneath a hopper feeder which is positioned at the top of a pole, and its function is to prevent the seed from falling to the ground. Thus, the birds can feed from a hopper feeder mounted at the top of the pole and from the catcher tray.

The invention also comprises the method of constructing bird feeders from the expanded mesh material.

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A bird feeder, comprising:
    a feed-containing body having at least a bottom and a side, wherein at least a portion of the body comprises expanded mesh, and wherein the body comprises a plurality of wood pieces, the wood pieces having grooves formed therein, and the expanded mesh being inserted in the grooves.

2. A bird feeder according to claim 1, wherein the expanded mesh is metal.

3. A bird feeder according to claim 2, wherein the metal is steel.

4. A bird feeder according to claim 1, wherein at least a portion of the bottom is formed of the expanded mesh.

5. A bird feeder according to claim 1, wherein the expanded mesh is formed of expanded steel.

6. A bird feeder according to claim 1, wherein the body comprises a flat feeder tray, and wherein at least a substantial portion of the body comprises the expanded mesh.

* * * * *